(12) United States Patent
Meyer-Bretschneider

(10) Patent No.: US 8,015,758 B2
(45) Date of Patent: Sep. 13, 2011

(54) NOISE INSULATION DEVICE FOR AIRCRAFT

(75) Inventor: Thomas J. Meyer-Bretschneider, Hamburg (DE)

(73) Assignee: Gesellschaft fur Larmschutz mbH, Hamburg (DE)

( * ) Notice: Subject to any disclaimer, the term of this patent is extended or adjusted under 35 U.S.C. 154(b) by 120 days.

(21) Appl. No.: 11/666,952

(22) PCT Filed: Nov. 3, 2005

(86) PCT No.: PCT/EP2005/011781
§ 371 (c)(1),
(2), (4) Date: Oct. 26, 2007

(87) PCT Pub. No.: WO2006/048289
PCT Pub. Date: Nov. 5, 2006

(65) Prior Publication Data
US 2008/0066396 A1 Mar. 20, 2008

(30) Foreign Application Priority Data
Nov. 3, 2004 (DE) .................... 20 2004 016 965 U

(51) Int. Cl.
*B64F 1/26* (2006.01)
*B64F 3/00* (2006.01)

(52) U.S. Cl. ............ 52/144; 52/65; 52/90.1; 244/114 B; 181/210; 181/218

(58) Field of Classification Search ............ 52/144, 52/90.1, 64, 65, 66, 67, 68, 70, 71, 72; *B64F 3/00*
See application file for complete search history.

(56) References Cited

U.S. PATENT DOCUMENTS

| | | | | |
|---|---|---|---|---|
| 2,315,953 A | * | 4/1943 | Goudie | 160/344 |
| 2,420,186 A | | 5/1947 | Miller et al. | |
| 2,608,363 A | * | 8/1952 | Shumaker | 244/114 B |
| 2,652,906 A | * | 9/1953 | Mitchell | 52/79.4 |
| 3,080,937 A | * | 3/1963 | Garbell | 181/210 |
| 3,096,847 A | * | 7/1963 | Hardy | 181/210 |
| 3,543,455 A | * | 12/1970 | Walsh | 52/64 |
| 3,604,530 A | * | 9/1971 | Duthion et al. | 181/210 |
| 3,630,313 A | * | 12/1971 | Smith | 181/218 |
| 3,739,537 A | | 6/1973 | Barnes | |
| 3,814,164 A | * | 6/1974 | Kuss | 160/120 |
| 3,842,941 A | * | 10/1974 | Gerber | 181/218 |
| 4,004,382 A | | 1/1977 | Carlson | |
| 4,207,964 A | * | 6/1980 | Taguchi | 181/284 |
| 4,513,840 A | * | 4/1985 | Johnson | 181/210 |

(Continued)

FOREIGN PATENT DOCUMENTS
DE 200 20 851 U1 2/2001
(Continued)

*Primary Examiner* — Brian Glessner
*Assistant Examiner* — Joseph J Sadlon
(74) *Attorney, Agent, or Firm* — Alix, Yale & Ristas, LLP

(57) ABSTRACT

Disclosed is a noise insulation device for aircraft, comprising a first opening that is delimited by a series of conducting surfaces whose inner edge is oriented towards the interior of the noise insulation device from a horizontal cross-sectional perspective and whose outer surface is directed towards the side, a roof, and a second opening which is located opposite the first opening and is delimited by walls. The inventive noise insulation device is characterized in that the size of the second opening can be modified by making changes to the walls.

13 Claims, 5 Drawing Sheets

U.S. PATENT DOCUMENTS

| | | | | |
|---|---|---|---|---|
| 4,958,700 | A | * | 9/1990 | Schafhaupt .................... 181/218 |
| 5,127,609 | A | * | 7/1992 | Lynn .......................... 244/114 B |
| 5,159,790 | A | * | 11/1992 | Harding ............................ 52/86 |
| 5,160,040 | A | * | 11/1992 | Odawara et al. ......... 210/167.31 |
| 5,170,831 | A | * | 12/1992 | Bilt ............................... 160/115 |
| 5,223,459 | A | * | 6/1993 | Odawara et al. .............. 454/236 |
| 5,377,534 | A | * | 1/1995 | Boet ......................... 73/112.01 |
| 6,016,888 | A | * | 1/2000 | Lynn ............................. 181/218 |
| 6,311,434 | B1 | * | 11/2001 | Nelson ............................ 52/143 |
| 6,637,168 | B2 | * | 10/2003 | Satomi et al. ................ 52/302.1 |
| 6,802,477 | B2 | * | 10/2004 | Campion .................. 244/114 B |
| 2002/0144473 | A1 | * | 10/2002 | Satomi et al. ................ 52/173.1 |
| 2002/0144474 | A1 | * | 10/2002 | Satomi et al. ................ 52/173.1 |
| 2007/0151797 | A1 | * | 7/2007 | Roark et al. ................... 181/210 |

FOREIGN PATENT DOCUMENTS

| | | | |
|---|---|---|---|
| GB | 1 089 630 A | | 11/1967 |
| GB | 2351770 A | * | 1/2001 |
| JP | 2000318696 A | * | 11/2000 |
| JP | P2000-318697 A | | 11/2000 |
| WO | WO 9318252 A1 | * | 9/1993 |
| WO | WO 98/06625 A | | 2/1998 |

* cited by examiner

NOISE INSULATION DEVICE FOR AIRCRAFT

BACKGROUND

After maintenance work, in particular after repairs, aircraft engines have to be tested in a test run. This produces a considerable amount of noise which has to be shielded, in particular if said test run includes operating the engines at full load.

In the case of a known noise insulation device of the type mentioned at the beginning (WO 98/06625), the aircraft is brought backwards into a noise insulation hangar. The hangar, which is generally entirely covered by a roof, has to have a considerable height in order to be able to accommodate the rudder unit, or a slot for the rudder unit has to be provided in the roof and then has to be closed after the aircraft is brought into the noise insulation hangar. The opening into which the aircraft is brought is then closed by doors which have conducting surfaces which damp the sound emerging to the front and also deflect the inflowing air in such a manner that it flows approximately in the longitudinal direction of the aircraft into the engines.

This previously known noise insulation hangar may indeed be designed highly effectively, as far as the damping of the outwardly penetrating noise is concerned. However, its construction is associated with high costs. This is because the roof has to cover large distances between the side walls over the entire length of the aircraft in a self-supporting manner, which, with the large wing spans of modern large-capacity aircraft, makes very expensive and complicated roof constructions necessary. Also, the heavy, door-like elements which support the conducting surfaces have to be able to be opened in order for the aircraft to be rolled in. This not only requires complicated rolling and driving systems. What is more, since the conducting surfaces are self-supporting, they also have to be of highly stable design. A further disadvantage is that the previously known noise insulation hangar cannot be expanded.

SUMMARY

A noise insulation device for aircraft of the type mentioned at the beginning can be produced more cost-effectively and can be expanded more easily.

The size of the rear opening is maintained in a manner such that it can be changed by making changes to the walls. This makes it possible for said second opening to be able to be enlarged by making changes to the walls to an extent such that the aircraft can be brought backwards into the noise insulation hangar. By making changes of this type, a subsequent expansion of the hangar can also be made possible.

The side walls, which form a tapering region in front of the rear, second opening during the test run of the engines can therefore be pivoted apart to an extent such that this region no longer tapers. The aircraft can then be brought through the second opening, i.e. backwards, into the noise insulation device. Furthermore, it is made possible only to move the front part of the aircraft under the roof; the rear part then remains without a roof covering. The roof can have a lower height in this case than if the rudder unit were also to be moved under the roof. In addition, the slot mentioned in the roof construction can be avoided. Since the aircraft is brought backwards into the roof covering, the roof construction also needs at most to cover a much smaller region of the entire wing span of the aircraft.

The roof surface can also be downwardly supported over the entire region, but at least largely predominantly, by supporting pillars which merely have to be spaced apart from one another in the center to an extent such that the aircraft fuselage can be brought between them. This not only greatly simplifies the roof construction but at the same time makes it substantially less expensive.

After the aircraft is brought in, the second opening can then be reduced in size again, as required by the shielding of the sound radiation, in particular to the side.

In this case, the air flows in through the conducting surfaces in a similar manner as in the prior art. However, it is no longer required to move the heavy conducting surfaces. On the contrary, they form rigid and fixed elements which can expediently also be connected permanently to the roof, thus increasing its stability. This also results in considerable cost reduction.

In an advantageous embodiment, it is provided that, after the aircraft is brought in, the walls are angled in such a manner that the region enclosed by them tapers from the first opening to the second opening, that the roof covers only a part of the noise insulation device, which part is adjacent to the first opening, and that the walls are at least partially pivotable about vertical axes, such that the aircraft is not obstructed as it rolls in.

If the aircraft is brought into the noise insulation device, then the walls are pivoted back until the region between them to the second opening tapers to the extent required in order to ensure the shielding device.

In the center axis of the device, the roof has to be at the height of the largest possible aircraft fuselage and, to the side, has to be at a height which does not obstruct the rolling in of the wings. However, the side walls, which, in particular, are fitted pivotably behind the roof, can have a smaller height. This height merely has to prevent sound from being able to propagate in an undesirable manner to the sides.

The change made to the walls, with which the size of the second opening is changed, can also consist in that the walls are displaceable. In particular, with the angled arrangement of the walls, it can be provided that the walls are not pivotable, as in the preceding embodiment, but rather are displaceable in the manner of sliding doors. As in the embodiment with the pivotable walls, the size of the second opening can also be changed.

In another embodiment, it is provided that the displaceable walls are oriented along the roof edge at different angles with respect to the longitudinal axis of the noise insulation device, in particular at a right angle, with, in order to avoid the engine jets of the aircraft blowing against the walls, corresponding openings being formed in the displaceable walls for the passage of the exhaust jet. In this case, the noise insulation hangar is essentially completely closed apart from the aircraft fuselage which penetrates to the outside and the openings mentioned.

It is also possible to form the walls described above from individual free-standing elements which are arranged tightly next to one another and can be movable with the aid of suitable devices and can be combined to form the desired wall regions. In this embodiment, the required openings for the engine jets and the region of the aircraft fuselage can also be provided by the free-standing elements being omitted at the appropriate locations.

The pivotable, displaceable or transportable walls which determine the shape of the second opening can advantageously cover a plurality of functions:

1. They permit adaptation as desired of the acoustic shielding effect to the local conditions by selecting different wall heights and wall lengths.
2. They are capable of combining the acoustic shielding effect with preventing external air from flowing into the opening from the rear. External air flowing in from the rear has to be prevented when starting the engines. It can result in considerable damage to the engines.
3. They make it easily possible, by pivoting of the side walls outward, to subsequently expand the hangar if larger, in particular wider aircraft are put into circulation.
4. They are not a hindrance in an additional expansion of the roof surface that may be required in the case of engines which are situated further to the rear. The roof surface may then be suspended, for example, on a simple supporting framework which is fitted subsequently irrespective of the pivotable walls beneath it.
5. Since the acoustic shielding effect does not require high weights, the side walls may be subsequently increased in height if the roof clearance has to be increased because wings are placed higher up in the expanded part. This saves considerable construction costs during an expansion.
6. The noise insulation device of the invention functions independently of the weather. This permits a direction of installation which is essentially independent of the prevailing wind direction. This fits in with the requirements of the users. In particular, a very costly additional concreting of rolling-in surfaces for the aircraft is avoided.

Frequently, the noise does not need to be shielded to the rear in the region in which the exhaust gases are discharged. The corresponding opening can therefore remain free if there is a sufficiently large unpopulated space there (for example the areas of the airport).

If the need arises, however, it can also be provided in this region, in an advantageous embodiment, that the noise insulation device has, in the region not covered by a roof, behind pivotable, tapering side walls, a backside wall which is movable in order to close the second opening. The movable backside wall is advantageously provided, at its side directed toward the opening, with an oblique surface with which the exhaust gases are directed upward. In order to be able to withstand the pressure of the exhaust gases ejected by the engines, the movable wall is provided, at its point directed away from the second opening, with supports which can advantageously simultaneously obtain a wind-deflecting shape by means of which air flows directed at the second opening are deflected upward. Corresponding arrangements can also be provided on the inside of the pivotable walls.

This wall can also be constructed from a plurality of elements which can be transported with the aid of suitable devices.

DETAILED DESCRIPTION OF THE PREFERRED EMBODIMENTS

Figure 1:
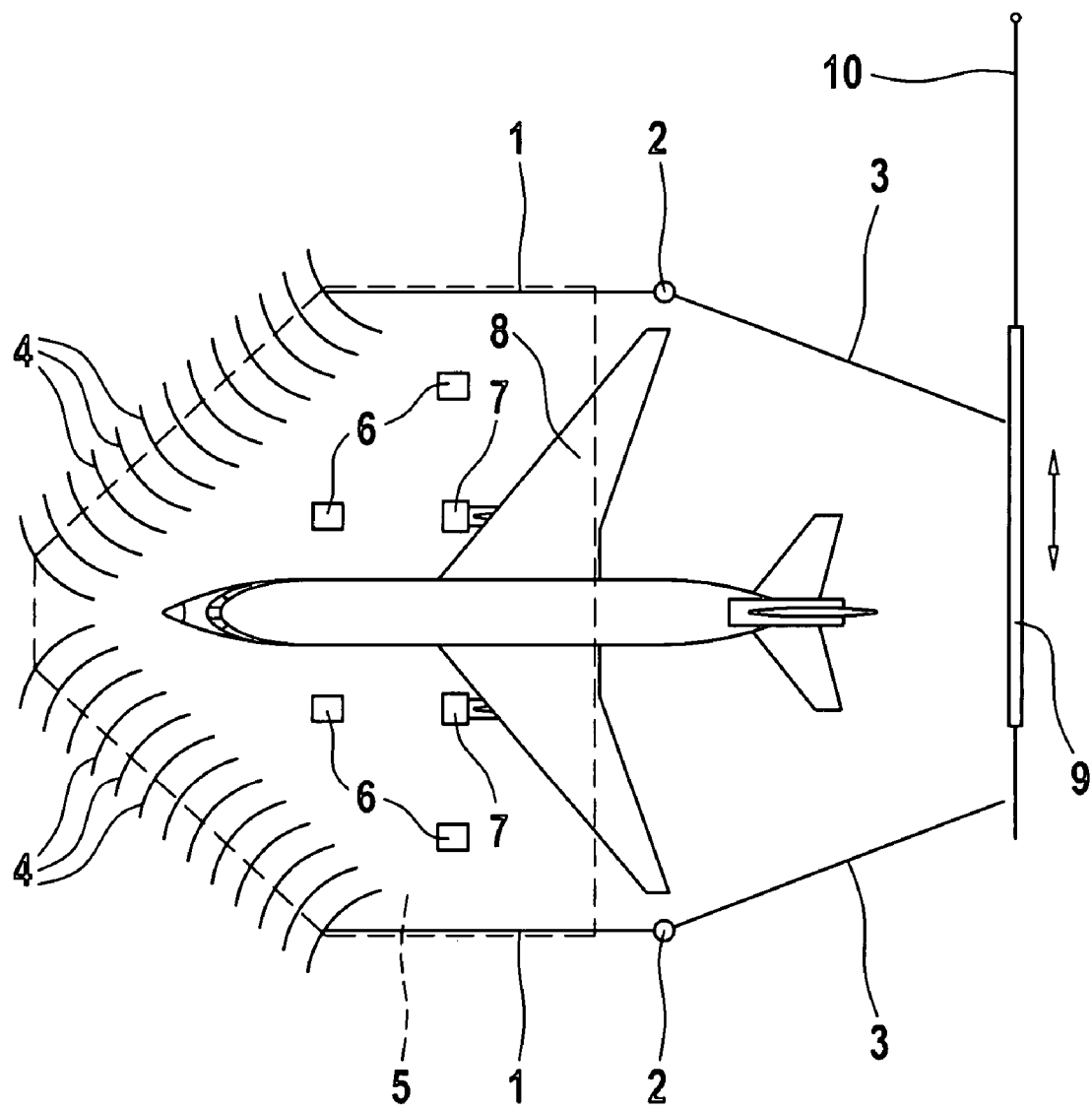
FIG. 1 shows, from above, a first embodiment of the noise insulation device with the aircraft brought into it.

FIG. 1 shows a first embodiment of the a noise insulation device which has fixed side walls 1, pivotable walls 3, coupled at 2, a group of conducting surfaces 4 and a roof indicated by dashed lines at 5. The roof is supported by means of supports 6 and by the side walls 1 and the conducting surfaces 4.

Figure 3:
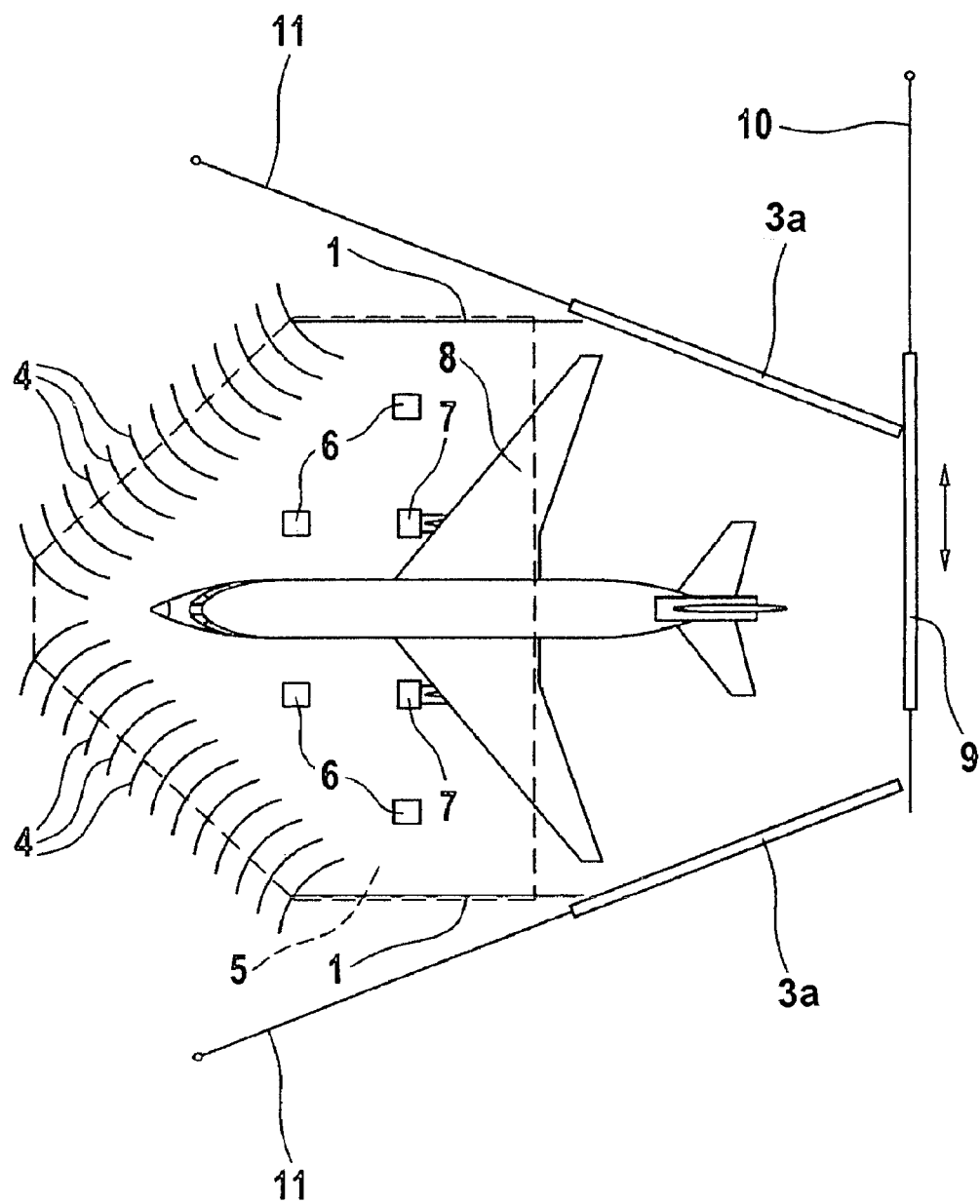
FIG. 3 shows, in a similar illustration as in FIG. 1, a second embodiment of the noise insulation device.

The movable walls 3, which can also be guided, for example, in the manner of rolling doors, are shown in FIGS. 1 and 3 in the position in which the engines 7 of the aircraft 8 are to be tested. The aircraft is moved until the wings are in the region below the roof 5. When the aircraft 8 is to be moved out of the noise insulation device or is to be moved into the latter, the walls 3 are pivoted or rolled outward as far as is required.

Figure 2:
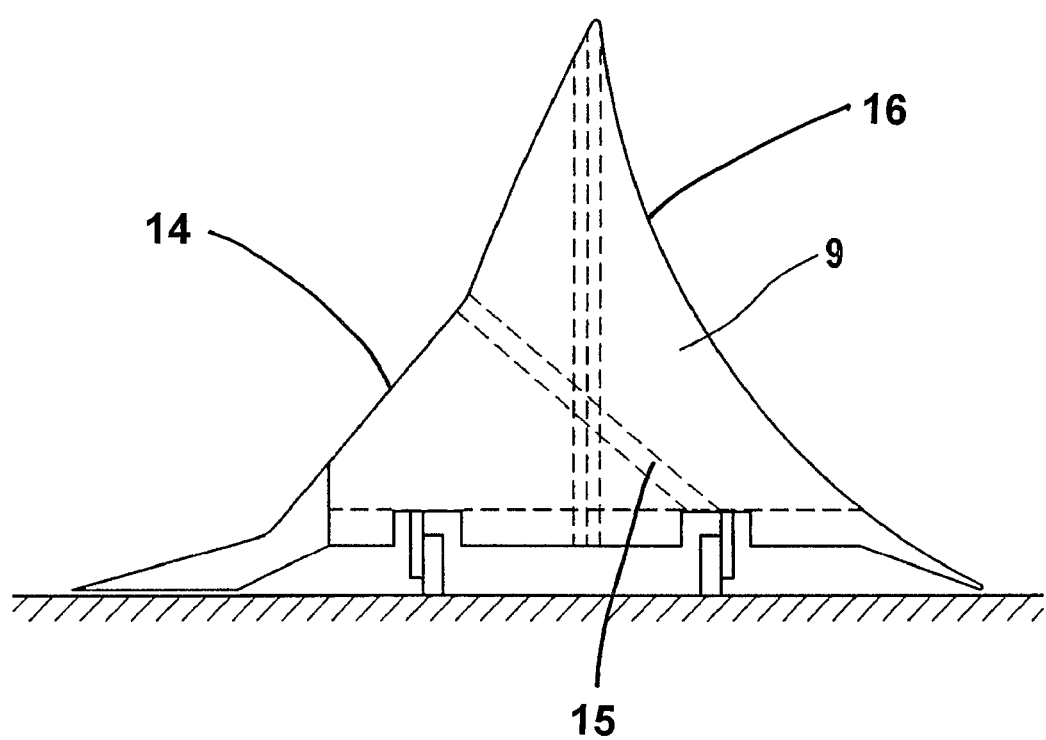
FIG. 2 shows a view from the side of the movable wall with which the rear opening of the noise insulation device can be covered.

The rear opening of the noise insulation device can be closed by a movable backside wall 9 which can be moved on rails 10. This backside wall is shown in FIG. 2 from the side. On both sides, it has covering surfaces 14 and 16 which are suitable for the deflection operation and with which the exhaust gases (14), on the one hand, and air flowing in from the rear (16), on the other hand, are deflected upward. In particular, the covering surfaces are oblique or curved or have a plurality of partial surfaces which approximate a curvature. One embodiment has supports 15 positioned proximate the side regions directed generally away from the second opening.

The fixed walls 1 and the conducting surfaces 4 advantageously reach as far as the roof 5 while, in the region which is not covered by a roof, the walls 3 and the movable backside wall 9 can have a lower height matched to the requirements to be imposed. Despite this lower height, the deflection of the exhaust gases and the sound shielding to the rear are ensured to the required extent, and lateral wind which has an adverse effect on the operation of the engines can also be prevented from entering.

In the embodiment of FIG. 3, the walls 3a are not pivotable but rather are movable in the wall direction 11. Otherwise, however, the geometry during the running of the engines corresponds to the embodiment of FIG. 1. If the walls 3a are moved into the opening position, there is just as much space as in the first embodiment for moving the aircraft in and out.

Figure 4:
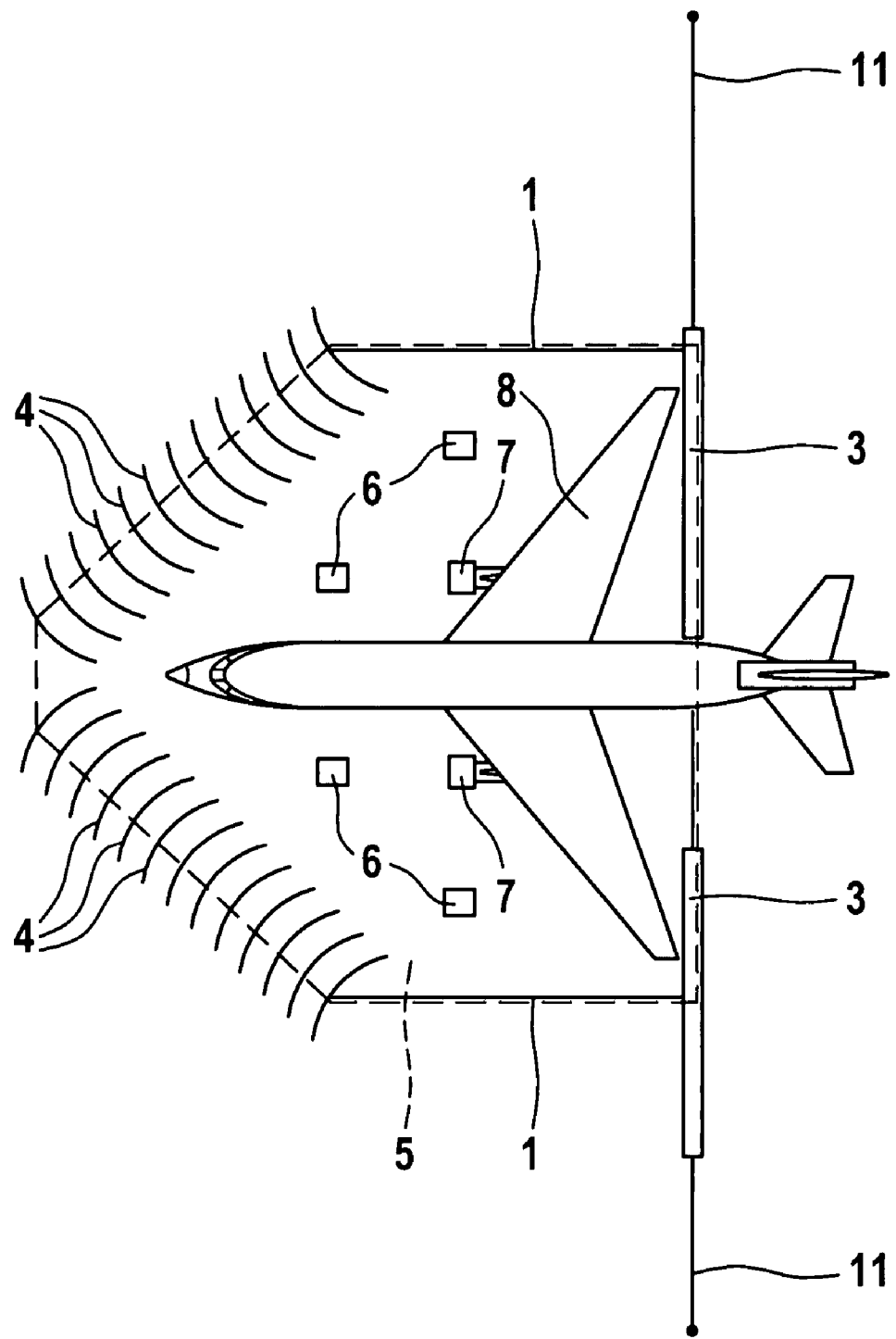
FIG. 4 shows, in a similar illustration as in FIG. 1, a third embodiment of the noise insulation device.

In the embodiment of FIG. 4, the walls are movable as in FIG. 3, but adjoin the roof surface in the transverse direction. FIG. 4 shows, at the top, a wall 3c which has been brought inward and, at the bottom, a wall 3c which has been partially moved out. In this embodiment, the roof 5 extends over the entire noise insulation device. If the walls are moved behind the engines, openings through which the engine jets can emerge then have to be provided in the walls 3c.

Figure 5:
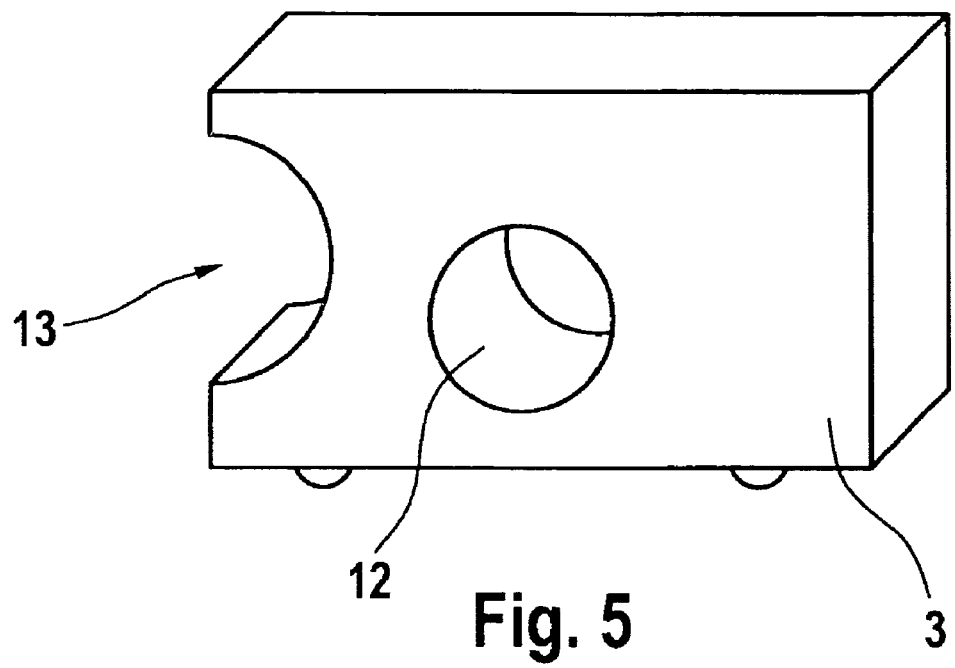
FIG. 5 shows a perspective illustration of a movable wall of the third embodiment.

If necessary for acoustic reasons, a corresponding recess can also be provided for the aircraft fuselage. FIG. 5 shows a corresponding wall 3 with an opening 12 for the engine jet and a recess 13 for the aircraft fuselage.

Figure 6:
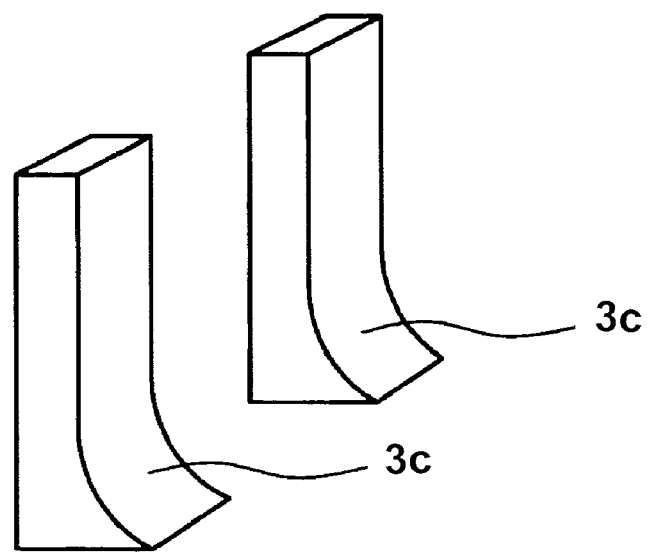
FIG. 6 shows wall elements from which the walls can be constructed.

The embodiment of FIG. 6 shows wall elements 3 which are movable individually and can be combined to form walls. In this case, in order to provide clearances corresponding to the recesses 12, 13, wall elements 3 can be respectively removed at the appropriate points.

The invention claimed is:
1. A noise insulation device for aircraft having a longitudinal axis with a first opening which is delimited by a series of conducting surfaces, the inner edge of which is directed, in horizontal section, into the interior of the noise insulation device and the outer edge of which is directed toward the side, with a rear, second opening which is situated opposite the first opening and is delimited by walls, characterized in that there are fixed side walls with a roof extending therebetween and at least two movable walls configured to be selectively movable relative to the fixed side walls, the size of the second opening can be changed by movement of at least one of the at least two movable walls, and two of the at least two movable walls are angled to define a rear at least partially enclosed region having a width and which tapers in a direction from the first opening to the second opening, wherein the width is reduced in the direction from the first opening to the second opening and said roof extends rearward from the first opening in the direction of the second opening without extending into said rear at least partially enclosed region.

2. The noise insulation device as claimed in claim 1, characterized in that the roof covers only a part of the noise insulation device, which part is adjacent to the first opening, and in that the two angled movable walls are at least partially pivotable about vertical axes.

3. The noise insulation device as claimed in claim 1, characterized in that at least one of the movable walls defines a longitudinal direction and is displaceable in the longitudinal direction.

4. The noise insulation device as claimed in claim 3, characterized in that the at least one movable wall that is displaceable in its longitudinal direction is oriented at different angles transversely with respect to the longitudinal axis of the noise insulation device and is designed with openings for the engine jets of the aircraft.

5. The noise insulation device as claimed in claim 3, characterized in that the at least one movable wall that is displaceable in its longitudinal direction is displaceable at an angle different from 90° with respect to the longitudinal axis of the noise insulation device.

6. The noise insulation device as claimed in claim 1, characterized in that the roof defines a space below the roof having a height and at least one part of the movable walls has a lower height than the height of the space.

7. The noise insulation device as claimed in claim 6, characterized in that at least the movable part of the movable walls is approximately half the height of the space below the roof.

8. The noise insulation device as claimed in claim 1, characterized in that it has a movable backside wall which is movable behind the second opening.

9. The noise insulation device as claimed in claim 8, characterized in that the movable backside wall is provided, on its side directed toward the second opening, with a curved oblique surface with which exhaust gases and noise from an aircraft in the enclosed region are deflected upward.

10. The noise insulation device as claimed in claim 8, characterized in that the movable backside wall has side regions directed away from the second opening, with supports at said side regions.

11. The noise insulation device as claimed in claim 10, characterized in that the supports comprise curved oblique surfaces by means of which air flows directed onto the second opening are deflected upward.

12. The noise insulation device as claimed in claim 9, characterized in that the second movable wall has side regions directed away from the second opening, with supports at said side regions.

13. A noise insulation device for aircraft having a longitudinal axis and a width with a first opening which is delimited by a series of conducting surfaces, the inner edge of which is directed, in horizontal section, into the interior of the noise insulation device and the outer edge of which is directed toward the side, with a roof and with a rear, second opening which is situated opposite the first opening and is delimited by walls, characterized in that there are movable walls, at least two of said movable walls being pivotable about a vertical axis, the size of the second opening can be changed by pivoting of at least one of said movable walls, and two of the at least two movable walls are angled to define a rear at least partially enclosed region having a width, with each of the at least two movable walls being pivotable about a vertical axis independent of the roof and the roof extends rearward across the entire width of the device and terminates prior to the longitudinal position of the vertical axes of the at least two movable walls.

* * * * *